Patented Jan. 6, 1948

2,433,992

UNITED STATES PATENT OFFICE 2,433,992

POLYMER PIGMENTATION

Malvern E. Hughes, San Jose, Calif., assignor to Shell Development Company, San Francisco, Calif., a corporation of Delaware No Drawing. Application March 28, 1944,
Serial No. 528,462

4 Claims. (Cl. 260—23)

This invention relates to the production of pigmented polymers of polymerizable unsaturated organic compounds.

Colored resins can sometimes be produced by the polymerization of a solution of a suitable dye in liquid monomer or in a mixture of monomer and polymer. However, many dyes exhibit a marked inhibiting effect upon polymerization or may alter the course of the polymerization reaction, yielding an inferior resin. The dye itself may be adversely affected by one or more other ingredients of the polymerization reaction mixture, particularly by the polymerization catalyst. Most of these objections apply as well to polymerization in the presence of pigments, which are subject to the additional difficulty of maintaining uniformity of dispersion.

Because of these and other difficulties, thermoplastic resins from polymerizable unsaturated compounds are commonly colored subsequently to the polymerization, wherever possible. The thermoplastic polymers may be ground with plasticizer, dye and/or pigment on a differential roll mill or in a Banbury mixer until the ingredients are fluxed and uniformly blended. The cold mixture is then comminuted and used in molding, or dispersed in a suitable solvent to form a lacquer. However, because the method depends in part upon the thermoplasticity of the polymer, it is not easily adapted to thermosetting resins. Furthermore, it cannot be used in the manufacture of cast massive pieces of resin, the so-called "turnery" resins, obtained by the polymerization of the polymerizable unsaturated compound in a mold.

An object of the present invention is to provide for the production of uniformly pigmented turnery resins. Another object is to provide a process of producing colored polymers of polymerizable unsaturated compounds. Another object is to provide for the production of pigmented resins in general. Another object is to provide new pigmented polymers. Another object is to provide for the uniform dispersion of pigments and polymerizable unsaturated organic compounds. Other objects will be apparent from the description of the invention given hereinafter.

These objects are accomplished in accordance with the present invention by the use of pigment-in-oil dispersions in the production of pigmented compositions comprising one or more polymerizable unsaturated compounds, by the polymerization of such pigmented compositions and by the resulting pigmented polymers. It has now been found that improved pigmented compositions can be obtained by a process which comprises: (1) milling a pigment with a small amount of oil, preferably a polyester of a higher aliphatic acid with a polyhydric aliphatic alcohol, until a fine dispersion of the pigment in the oil is obtained; (2) dispersing the pigment in a polymerizable unsaturated compound such as a liquid monomer or a liquid mixture of monomer and polymer of a polymerizable unsaturated organic compound; and (3) subjecting the mixture to polymerization conditions until the polymerization is substantially complete.

The pigment used may be from mineral, vegetable or animal sources. Inorganic pigments such as metallic salts and metallic oxides are preferred. Representative examples of pigments which may be employed are baryta white, zinc white, flake white, yellow ochre, raw sienna, true Naples yellow, artificial vermilion, native vermilion, Indian red, light red, Venetian red, red ochre, cobalt violet, manganese violet, Viridian (emerald oxide of chromium), green oxide of chromium, cobalt green, green ultramarine, ultramarine, artificial ultramarine, cobalt, coeruleum, burnt sienna, raw and burnt umber, Cappagh brown, Verona brown, Prussian brown, ivory black, charcoal black, lamp-black and graphite. Luminescent, including both phosphorescent and fluorescent pigments, may be employed. Pigments containing elements or groups which inhibit or retard polymerization should be avoided. Pigments containing divalent sulfur are generally undesirable. A single pigment may be used alone in compounding in accordance with the invention or two or more pigments may be used together.

Preferred oils in which the pigments may be dispersed are polyesters of higher aliphatic monocarboxylic acids with polyhydric aliphatic alcohols. Esters of unsaturated monocarboxylic open chain aliphatic acids having at least 16 carbon atoms and an iodine number (Wijs) of at least 120 are preferred. Examples of preferred acids are palmitoleic, oleic, linoleic, linolenic, arachadonic, clupanodonic, eleostearic and licanic acids.

Other preferred acids can be made by the treatment (isomerization) of acids containing isolated double bonds to bring about conjugation of the double bonds, as disclosed by Scheiber in U. S. Patent 1,896,467. Others are made by dehydrating acids containing one or more hydroxyl groups, as exemplified by the dehydration of ricinoleic acid, forming the acid known as 9,11-linoleic acid, octadecadienic acid and ricinic acid. Others result from dehydrogenation of fatty oil acids, the process usually involving in actual practice the introduction of halogen, followed by dehydrohalogenation. Obviously, isomerization, dehydration and dehydrogenation can be effected upon derivatives of the acids, such as the glycerides, rather than upon the acids themselves, followed by the production of the acids from the derivatives. There are many other suitable acids. The esters may contain saturated as well as unsaturated acid radicals.

Preferred polyhydric aliphatic alcohols are substantially devoid of polymerizable unsaturated carbon-to-carbon linkages, are open chain in structure and have from 3 to about 10 alcoholic hydroxyl groups in the molecule. Examples of such alcohols are glycerol, diglycerol, the higher polyglycerols, pentaglycerol, pentaerythritol and polymers of unsaturated alcohols, e. g. vinyl alcohol and allyl alcohol of a suitable molecular weight, which may be hydrogenated or otherwise treated to reduce any residual unsaturation.

Natural or synthetic oils may be used. Many of the naturally-occurring drying oils are suitable. Examples are chia, hempseed, linseed, perilla, safflower, soybean and walnut oils, which consist of glycerides of oleic, linoleic, linolenic and a small proportion of saturated acids. Fish oils commercially available for use in coating compositions contain glycerides of the above acids and, in addition, of palmitoleic, arachidonic and clupanodonic acids. The glycerides of oiticica oil are those of the valuable, triply conjugated keto acid called licanic acid, in addition to glycerides of oleic and saturated acids. The acid radicals of tung oil are those of saturated acids, oleic acid and the triply conjugated eleostearic acid. In poppyseed and sunflowerseed oils, glycerides of oleic, linoleic and saturated fatty acids are present. Many other oils containing these and other glycerides are known. Examples of other oils are oiticica oil, Japanese wood oil, walnut seed oil, rubber seed oil, dehydrated castor oil, etc. In most oils, at least a portion of the glycerides are mixed glycerides, in which the molecule contains more than one kind of acid radical. Many other natural drying oils are suitable.

Synthetic oils may be produced by esterifying one or more polyhydric alcohols with one or more saturated, or preferably, unsaturated, aliphatic monocarboxylic acids by known or special methods.

A single oil may be used alone in compounding in accordance with the invention or two or more oils may be used together.

The pigment-in-oil dispersion can be produced by grinding the pigment with the oil in any suitable manner, e. g. by means of a pestle and mortar, a ball mill, a three-roll ink mill or other suitable apparatus. The grinding should be continued until a uniform dispersion is obtained and preferably until the average particle size of the pigment is reduced to .2 mm. or less diameter.

The desirable ratio of oil to pigment is dependent upon the nature of the ingredients and upon the intended use. Ratios within the range of about 20 parts by weight of oil to 100 parts of pigment to about 175 parts of oil to 100 parts of pigment have been used. The lower ratios are preferred for pigments such as lead oxide and zinc oxide. The higher ratios are required for raw sienna, burnt sienna and the like. In general, the ingredients used should be in such proportions that the final pigment-in-oil dispersion, including any adjuvants which may be present, has a consistency at room temperature such that a small amount of it, e. g. 10 g., does not flow under its own weight but can be made to flow by the application of light pressure, e. g. 1 p. s. i.

In addition to one or more pigments and one or more oils the dispersion may or may not contain other ingredients. Driers (siccatives) may be present. Examples of driers are litharge, lead acetate, the resinates and linoleates of manganese, lead and cobalt, manganese dioxide, manganous borate, etc. Copal, amber and other natural and synthetic resins may be added. Small amounts of waxes, e. g. beeswax, may be present. If desired, the dispersion of the pigment in the oil may be assisted by the presence of one or more low-boiling liquids, which may or may not be subsequently partially or completely removed.

Pigmented polymers and co-polymers of substantially any polymerizable unsaturated compound can be produced in accordance with the invention. Included are both conjugated and unconjugated unsaturated polymerizable compounds. One group of unconjugated unsaturated polymerizable organic compounds consists of those having but a single polymerizable unsaturated carbon-to-carbon linkage in the molecule. Notable among these are compounds having a single polymerizable olefinic linkage, examples of which are styrene, substituted styrenes, vinyl esters of saturated monocarboxylic acids such as vinyl acetate, vinyl propionate, vinyl butyrate, vinyl valerate, vinyl benzoate, etc., saturated esters of unsaturated monocarboxylic acids such as methyl acrylate, methyl methacrylate, etc., allyl esters of saturated monocarboxylic acids such as allyl acetate, allyl propionate, allyl butyrate, allyl isobutyrate, beta-methylallyl acetate, beta-chlorallyl acetate, beta-ethylallyl formate, beta-phenylallyl acetate, beta-methoxyallyl acetate, beta-chloromethylallyl acetate, allyl benzoate, beta-methylallyl acetate, allyl toluate, allyl salicylate, allyl glycolate, allyl methoxy-acetate, beta-methylallyl chloracetate, allyl beta-chloropropionate, allyl lactate, allyl naphthenate, beta-methylallyl chlorobenzoate, allyl alpha-hydroxyisobutyrate, allyl acetylglycolate, allyl levulinate, beta-methylallyl butyrate, alpha-methylallyl acetate, alpha-phenylallyl acetate, allyl ethoxyformate, beta-methylallyl phenoxyformate, allyl naphthoate, allyl esters of hydrogenated abietic acid, etc.

Another important group of unconjugated polymerizable compounds consists of those having two or more non-conjugated polymerizable unsaturated carbon-to-carbon linkages in the molecule. Of these a subgroup consists of unsaturated aliphatic organic polyesters of polyhydric alcohols such as the acrylic, methacrylic and crotonic polyesters of glycol, diethylene glycol, glycerol and the like. Another subgroup consists of unsaturated aliphatic esters of unsaturated aliphatic monocarboxylic acids such as the vinyl, allyl and methallyl esters of acrylic, methacrylic, chloroacrylic, crotonic and cinnamic acids. A preferred subgroup, which consists of those compounds with which the importance of the invention is most apparent, comprises esters of polycarboxylic acids with unsaturated alcohols of aliphatic character.

Suitable unsaturated alcohols whose ester radicals may constitute a part of these preferred compounds are those having an unsaturated linkage of aliphatic character between two carbon atoms, one of which is directly attached to a carbon atom to which is directly attached an alcoholic hydroxyl group. These compounds can be described also as alcohols of aliphatic character having an unsaturated linkage between two carbon atoms, at least one of which is not more than once removed from the alcoholic hydroxyl group.

One subgroup of unsaturated alcohols within the foregoing definition consists of allyl-type alcohols. Allyl-type alcohols are unsaturated compounds having an olefinic double bond of aliphatic character between two carbon atoms, one of which is directly joined to a saturated carbinol carbon atom. They have a structure which may be represented by the general structural formula

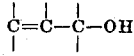

Preferred allyl-type alcohols have a terminal methylene group attached directly by an olefinic double bond to a carbon atom which is attached directly to a saturated carbinol carbon atom, as represented by the formula

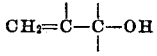

Allyl-type alcohols useful as components of the preferred compounds of the present invention preferably have not more than about eighteen carbon atoms and have at least one unsaturated carbon-to-carbon linkage for each six carbon atoms.

Representative examples of preferred allyl-type alcohols are the following: allyl alcohol, methallyl alcohol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3 - dimethyl-buten-1-ol-3, hepten-1-ol-3, 4-methyl-hexen-1-ol-3, 5-methyl-hexen-1-ol - 3, 4,4' - dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1- ol - 3, 4-phenyl-buten-1-ol-3, 4-tolyl-buten-1 - ol - 3, 4-xylyl-buten-1-ol-3, 3-naphthyl-propen-1-ol-3, 4-chloro-buten-1-ol-3, pentadien-1, 4-ol-3, hexen-1-yn-5-ol-3, 2 - methyl-penten-1-yn-4-ol-3, and 2,5-dimethyl-hexadien-1,5-ol-4. Other allyl-type alcohols are crotyl alcohol, tiglyl alcohol, 3-chlo-robuten-2-ol-1, cinnamyl alcohol, hexadien-2,4-ol-1, hexadien-2,5-ol-1, butadien-2,3-ol-1, hexadien - 3,5-ol-2, 2-methyl-hexen-2-ol-1, 2-methyl-penten - 2 - ol - 1, 3,7-dimethyl-octadien-2,7-ol-1, cyclopenten-2-ol-1, cyclohexen-2-ol-1, etc.

Another subgroup of suitable unsaturated alcohols consists of alpha-unsaturated aliphatic alcohols, e. g. vinyl-type alcohols, which are compounds having a double bond of aliphatic character between two carbon atoms, one of which is directly attached to an alcoholic hydroxyl group, as represented by the general formula

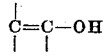

Of the vinyl-type alcohols a preferred subgroup consists of compounds having a terminal methylene group attached by an olefinic double bond to a carbinol carbon atom, as represented by the general formula

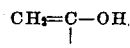

Examples of preferred vinyl-type alcohols are vinyl alcohol, isopropenol, buten-1-ol-2, etc. Examples of other vinyl-type alcohols are propen-1-ol-1, buten-1-ol-1, cyclohexen-1-ol-1, cyclopenten-1-ol-1, etc. Vinyl alcohol is the preferred specific alpha-unsaturated alcohol.

Other unsaturated alcohols whose radicals may constitute part of the compounds with which the invention is concerned are those having a triple bond of aliphatic character between two carbon atoms, one of which is directly attached to a saturated carbon atom, which in turn is directly attached to an alcoholic hydroxyl group as represented by the general formula

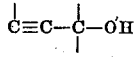

as exemplified by propargyl alcohol, pentyn-3-ol-2, 2-methyl-hexyn-3-ol-2, etc.

Polycarboxylic acids whose radicals may form part of the preferred esters in accordance with the invention include saturated acyclic aliphatic acids such as oxalic, malonic, glutaric, adipic, pimelic, suberic, azelaic, sebacic, tartaric, citric, tricarballylic, etc.

Another group consists of alicarbocyclic and heterocyclic polycarboxylic acids, e. g. cyclohexane-1,2-dicarboxylic, tetrahydrophthalic, pentane-1,2-dicarboxylic, etc. acids.

Another group consists of ethereal oxygen-containing polycarboxylic acids such as diglycolic, dilactic, dihydracrylic, etc. and compounds best represented by the following formulas:

$$HOOC-CH(CH_3)-O-CH_2-COOH$$
$$HOOC-CH_2-CH_2-O-CH_2-COOH$$
$$HOOC-CH(CH_3)-CH_2-O-CH_2-COOH$$
$$HOOC-CH(CH_3)-O-CH_2-CH_2-COOH$$
$$HOOC-CH(CH_3)-CH_2-O-CH_2-CH_2-COOH$$

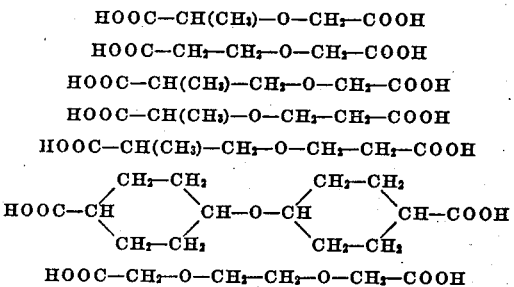

$$HOOC-CH_2-O-CH_2-CH_2-O-CH_2-COOH$$

Another group consists of sulfonyl-containing polycarboxylic acids, e. g. sulfonyl diglycolic, sulfonyl dihydracrylic, sulfonyl dilactic, etc. acids. Another group consists of unsaturated aliphatic polycarboxylic acids such as itaconic, citraconic, aconitic, etc. Another and preferred group consists of aromatic polycarboxylic acids, i. e. acids having two or more carboxyl groups directly attached to an aromatic ring. Among the many suitable aromatic polycarboxylic acids are phthalic, isophthalic, terephthalic, naphthalene dicarboxylic, dimethyl phthalic, dichlorophthalic, etc., acids and the corresponding higher polycarboxylic acids. Among the many other suitable acids are tetrachlorophthalic acid and the other polyhalobenzene polycarboxylic acids.

Simple or mixed esters may be used.

Examples of suitable polymerizable unsaturated aromatic polycarboxylic acid esters are diallyl phthalate, dimethallyl phthalate, dichloro-allyl phthalate, diethallyl phthalate, diallyl isophthalate, dimethallyl isophthalate, allyl choro-allyl phthalate, allyl crotyl phthalate, diallyl tetrachlorophthalate, dimethallyl tetrachloro-phthalate, divinyl phthalate, di-isopropenyl phthalate, allyl vinyl phthalate, methallyl vinyl phthalate, chloroallyl vinyl phthalate, allyl isopropenyl phthalate, methallyl isopropenyl phthalate, allyl (butene-1-yl-2) phthalate, crotyl vinyl phthalate, crotyl propargyl phthalate, allyl propargyl phthalate and the corresponding esters of the higher polycarboxylic aromatic acids. The compound specifically preferred by reason of its stability under polymerization conditions, the ease and comparative cheapness of its preparation, its ready polymerizability and the high quality and reproducibility of products containing the polymer is diallyl phthalate.

Examples of suitable unsaturated esters of disaturated aliphatic polycarboxylic acids are diallyl oxalate, divinyl oxalate, diallyl malonate, diallyl adipate, allyl vinyl adipate, diallyl citrate, etc. Examples of suitable unsaturated esters of ethereal oxygen-containing polycarboxylic acids are diallyl diglycolate, diallyl dihydracrylate, diallyl dilactate, dimethallyl diglycolate, allyl vinyl diglycolate, etc. Examples of suitable esters of sulfonyl-containing carboxylic acids are diallyl sulfonyl diglycolate (also known as diallyl dimethylsulfone alpha,alpha'-dicarboxylate), diallyl sulfonyl dihydracrylate (also known as diallyl diethylsulfone beta,beta'-dicarboxylate), etc. Examples of unsaturated aliphatic polycarboxylic acid esters which may be polymerized in accordance with the invention are diallyl maleate, diallyl itaconate, diallyl citraconate, etc.

In the case of esters of unsaturated alcohols with polycarboxylic acids but a single carboxyl group of the acid may be esterified with an unsaturated alcohol, the remaining carboxyl group or groups being unesterified or esterified with a saturated alcohol; or the carboxyl groups of the acid may be esterified with two or more different unsaturated alcohols.

The invention can be applied to polymerizable esters of saturated alcohols with unsaturated acids, such as the methyl, ethyl, propyl, cyclohexyl, benzyl, etc., esters of acrylic, ethacrylic, alpha-chloroacrylic, itaconic, citraconic, etc., acids. Likewise it applies to polymerizable esters containing other functional groups and to polymerizable compounds which are not esters, e. g. ethers, acetals, ketones, aldehydes, acids, hydrocarbons, etc.

Still another group of polymerizable compounds to which the process of the invention can be applied are the unsaturated alcohol esters of inorganic acids, such as the allyl-type esters and vinyl-type esters of orthoboric, ortho-silicic, phosphoric, sulfuric, etc., acids.

Hydrocarbons and substituted hydrocarbons containing in the molecule two or more, preferably two, polymerizable unsaturated carbon-to-carbon linkages capable of polymerization under the catalytic influence of an oxygen-yielding catalyst can be treated in accordance with the invention. Prominent examples of such hydrocarbons are butadiene, isoprene, 2-methyl-1,3-pentadiene, the heptadienes, the octadienes, etc.

The above-mentioned and other polymerizable compounds can be polymerized alone or in admixture with one or more other polymerizable compounds.

The pigment-in-oil dispersion may be mixed with a substantially unpolymerized monomer of a polymerizable unsaturated compound. Preferred practice, however, is to employ a pourable mixture, e. g. a pourable liquid mixture, of a monomer of a polymerizable unsaturated compound with a polymer of a polymerizable unsaturated compound. Such a mixture may be produced by the partial polymerization of the unsaturated compound or by the admixture of monomer with separately produced polymer. Polymer produced by polymerization with heat in the absence of a polymerization catalyst or in the presence of not more than about 0.05% of benzoyl peroxide or its equivalent is of low intrinsic viscosity. Polymer so produced is herein called "thermal polymer." Mixtures of monomer with soluble thermal polymer have a high polymer content per given viscosity and great penetrating power per given polymer content. The curing of such mixtures in the presence of a polymerization catalyst is relatively rapid and the loss of monomer by evaporation during curing is relatively low. For these and other reasons it is preferred to make use of pourable pigmented monomer/thermal polymer mixtures in proceeding in accordance with the invention. The polymer content of such mixtures may be as great as 55% or more by weight of the total content of the monomer and polymer in the case of the allyl-type esters of polycarboxylic acids.

It has been found that pigment-in-oil dispersions can be effectively dispersed in liquid polymerizable unsaturated compounds by agitation such as rapid stirring. Other methods of agitation can be employed, such as blowing with a gas, preferably an inert gas, tumbling, etc. The agitation should be sufficiently vigorous and prolonged to bring about the uniform dispersion of the pigment in the liquid polymerizable unsaturated compound.

Polymerization catalysts may be present. Benzoyl peroxide is a generally effective polymerization catalyst. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides such as tertiary butyl hydroperoxide (often called simply tertiary butyl peroxide), di(tertiary alkyl) peroxides such as di(tertiary butyl) peroxide, peracetic acid, perphthalic acid, perborates, persulfates, etc. The compounds may be polymerized in the presence of their own peroxides or of their ozonides. Metals and metallic salts may be used as polymerization catalysts. If desired, mixtures of polymerization catalysts may be used. In some cases it may be desirable to conduct the polymerization in the concurrent presence of both a catalyst and an inhibitor of polymerization. Amounts of peroxide catalyst between about 0.01% and about 5% by weight of the polymerizable unsaturated compound or compounds are usually satisfactory, although the amount is not necessarily limited to this range. In some cases, it may be unnecessary to use any catalyst at all.

Polymerization reactions in accordance with the invention can be carried out in a continuous or batchwise manner at atmospheric, superatmospheric or reduced pressures. The invention is particularly important in the production of cast shapes by polymerization in a mold in the substantial absence of solvent or non-solvent diluent. So far as we are aware uniformly pigmented cast resins from unsaturated polyesters of polycarboxylic acids, such as diallyl phthalate, have not been produced in any other way. Polymerization may be carried out under a blanket of an inert gas such as nitrogen, carbon dioxide, etc.

Polymerization is generally carried out under the influence of heat, the temperature used being dependent upon many factors. In general, temperatures of from about room temperature to about 300° C. have been used. The polymerization of diallyl phthalate in accordance with the invention is preferably effected at between about 60° C. and about 250° C. employing in the lower range, e. g. 60° C. to 130° C., a catalyst such as benzoyl peroxide which is effective and relatively stable in that range, and in the higher range, e. g. 130° C. to 250° C., a catalyst such as tertiary butyl hydroperoxide or a di(tertiary alkyl) peroxide. It is sometimes desirable to polymerize in two or more different stages using different temperatures and/or different catalysts. With methyl methacrylate, temperatures of from about 60° C. to about 150° C. are preferred.

The polymerization reaction will usually be carried to substantial completion without substantial interruption. For special purposes, however, it may be stopped at any point short of completion and eventually carried to completion.

The polymers and co-polymers of the invention can be modified by admixture with other synthetic resins, natural resins, cellulose derivatives and drying oils. Examples of synthetic resins in addition to polymers of the polymerizable unsaturated compounds designated above are alkyd resins, urea-aldehyde resins, phenol-aldehyde resins, synthetic linear polyamides and synthetic linear polyester-amides. There may also be present one or more plasticizers, stabilizers, lubricants, dyes, etc.

The products of pigmentation and polymerization in accordance with the invention are polymers of unsaturated compounds containing uniformly dispersed pigment particles. Many of the polymers are solid resins characterized by excellent color, resistance to weathering and resistance to the chemical and physical action of water and of a large number of ester-type and hydrocarbon solvents. Sheets, rods, tubes, thin films and complicated two- and three-dimensional shapes can be produced. Some of the resins are useful in the production of fountain pen barrels, brush backs, drafting instruments, umbrella handles, door knobs, articles of furniture and of ornamentation. The invention is particularly valuable in the production of hard, physiologically inactive resinous compositions for use in dentures, dental crowns, dental inlays and dental fillings and, as well, fillings for other body cavities. The products are particularly important in the manufacture of costume jewelry. Cast resins produced by the process of the invention can be reduced to a particulate state and used alone or in admixture with modifying substances in molding, coating, impregnating and like compositions.

Some of the many ways in which the invention can be practiced are illustrated by the following examples in which parts are on a weight basis.

Example I

A mixture of diallyl phthalate, 100 parts, and benzoyl peroxide, 5 parts, is heated at 65° C. with stirring for 5 hours. To the resulting pourable liquid mixture of monomer and partial polymer is added a small amount (about .05 part) of burnt sienna, finely ground and uniformly dispersed in poppyseed oil containing a trace of copal resin and a small amount of fused drier. The mixture is stirred vigorously until the pigment is uniformly dispersed in the monomer/polymer mixture. The resulting mixture is heated at 65° C. in an oven for an additional 100 hours. The product is polymeric diallyl phthalate, hard, infusible, insoluble in common solvents, uniformly pigmented.

Example II

Diallyl phthalate having a refractive index of 1.5200 is maintained at 200° C. to 205° C. for 3 hours and 10 minutes under a blanket of carbon dioxide. The refractive index increases to 1.5355 and the Gardner-Holt viscosity is between $Z_1$ and $Z_2$. 100 parts of the resulting pourable liquid monomer/thermal polymer mixture are then admixed with 5 parts of benzoyl peroxide catalyst and with about 0.01 part of a finely ground yellow ochre dispersed in poppyseed oil. The uniform mixture is then introduced into a glass mold, which is sealed and maintained at 65° C. for 72 hours, then at 90° C. for an additional 72 hours.

Example III

Diallyl diglycolate, 100 parts, is admixed with tertiary butyl hydroperoxide, 0.01 part. The mixture is held at between 200° C. and 205° C. for 30 minutes. Benzoyl peroxide, 5 parts, and a pigment comprising chromium oxide, 0.01 part, uniformly dispersed in a small amount of boiled linseed oil are then added with vigorous agitation. The resulting pourable and uniform mixture is then hardened by polymerization in a sealed glass mold at 90° C. for the first 60 hours, followed by 125° C. for an additional 60 hours.

Example IV

Methyl methacrylate is heated for 4 hours at 70° C. in a vessel open to the air. The resulting pourable liquid syrup comprising a mixture of monomer and polymer is then mixed with .001% of burnt umber which has been finely ground with an equal amount of oiticica oil. The dispersion is then maintained at 70° C. for 3 days, at the end of which time it is hard and substantially completely polymerized.

I claim as my invention:

1. A process comprising uniformly dispersing a comminuted pigment by grinding the pigment in a drying oil, dispersing the dispersion of pigment in a resin-forming, heat-polymerizable, liquid unsaturated compound, and maintaining the resulting mixture at a temperature between 60° C. and 300° C. to effect polymerization thereof into a uniform, evenly pigmented, solid mass.

2. A process of producing a pigmented resin comprising uniformly dispersing a comminuted pigment by grinding the pigment in a drying oil, dispersing the dispersion of pigment in a liquid comprising a resin-forming, heat-polymerizable, unsaturated polyester of a polycarboxylic acid, and subsequently maintaining the resultant mixture at a temperature between 60° C. and 300° C. to effect polymerization thereof into a uniform, evenly pigmented, solid mass.

3. The process according to claim 2 in which the heat-polymerizable unsaturated polyester is diallyl phthalate.

4. A process of producing a pigmented solid resin which comprises uniformly distributing a dispersion of comminuted pigment, prepared by grinding the pigment in poppyseed oil, in a liquid mixture of monomeric diallyl phthalate and polymerized diallyl phthalate, and maintaining the resulting mixture at a temperature between 60° C. and 300° C. to effect polymerization thereof into a uniform, evenly pigmented, solid mass.

MALVERN E. HUGHES.

REFERENCES CITED

The following references are of record in the file of this patent:

UNITED STATES PATENTS

| Number | Name | Date |
|---|---|---|
| 2,218,439 | Rothrock | Oct. 15, 1940 |
| 2,344,137 | Drummond et al. | Mar. 14, 1944 |

FOREIGN PATENTS

| Number | Country | Date |
|---|---|---|
| 367,102 | Great Britain | Feb. 18, 1932 |
| 116,686 | Australia | Mar. 8, 1943 |